(12) United States Patent
Nakajima et al.

(10) Patent No.: US 7,157,168 B2
(45) Date of Patent: Jan. 2, 2007

(54) REGULATOR

(75) Inventors: Yoji Nakajima, Kakuda (JP); Kazuki Ishikawa, Kakuda (JP); Takashi Yoshida, Kakuda (JP); Katsumi Sahoda, Utsunomiya (JP); Kouji Miyano, Utsunomiya (JP)

(73) Assignee: Keihin Corporation, Tokyo (JP)

( * ) Notice: Subject to any disclaimer, the term of this patent is extended or adjusted under 35 U.S.C. 154(b) by 147 days.

(21) Appl. No.: 10/725,864

(22) Filed: Dec. 1, 2003

(65) Prior Publication Data

US 2004/0231726 A1 Nov. 25, 2004

(30) Foreign Application Priority Data

Nov. 29, 2002 (JP) ............... 2002-347512

(51) Int. Cl.
*G05D 16/02* (2006.01)
*H01M 8/04* (2006.01)

(52) U.S. Cl. ............... 429/22; 137/484.8; 137/505.18; 137/505.37; 429/25

(58) Field of Classification Search ............ 137/484.8, 137/505.18, 505.37; 429/22, 25
See application file for complete search history.

(56) References Cited

U.S. PATENT DOCUMENTS

| | | | | | |
|---|---|---|---|---|---|
| 2,519,333 | A | * | 8/1950 | Annin | 137/505.37 |
| 2,841,173 | A | * | 7/1958 | Masom et al. | 137/505.18 |
| 2,941,543 | A | * | 6/1960 | Kleczek | 137/505.18 |
| 3,086,548 | A | * | 4/1963 | Galiger et al. | 137/484.8 |
| 3,668,013 | A | * | 6/1972 | Franz | 429/25 |
| 3,753,446 | A | * | 8/1973 | Hoogeboom | 137/484.8 |
| 3,926,208 | A | * | 12/1975 | Hoffman | 137/484.8 |
| 4,279,271 | A | * | 7/1981 | Neff | 137/505.18 |
| 4,760,866 | A | * | 8/1988 | Adler | 137/505.18 |
| 5,381,819 | A | * | 1/1995 | Gotthelf | 137/484.8 |
| 5,441,821 | A | * | 8/1995 | Merritt et al. | 429/17 |
| 5,755,254 | A | * | 5/1998 | Carter et al. | 137/505.18 |
| 6,155,290 | A | | 12/2000 | Nakajima et al. | |
| 6,629,544 | B1 | * | 10/2003 | Nakajima et al. | 137/505.18 |
| 2001/0012575 | A1 | * | 8/2001 | Katagiri et al. | 429/22 |

FOREIGN PATENT DOCUMENTS

| | | |
|---|---|---|
| JP | 62-002653 | 1/1987 |
| JP | 02-018111 | 2/1990 |
| JP | 3040627 | 6/1997 |
| JP | 11-270717 | 5/1999 |
| JP | 2936820 | 6/1999 |
| JP | 2002-182751 | 6/2002 |

OTHER PUBLICATIONS

Office Action in corresponding JP 2002-347512 issued Oct. 10, 2006.

* cited by examiner

*Primary Examiner*—Stephen M. Hepperle
(74) *Attorney, Agent, or Firm*—Lahive & Cockfield, LLP; Anthony A. Laurentano, Esq.

(57) ABSTRACT

A back pressure chamber is defined at an end of a rod for acting in a direction to cancel out a pressure applied to a valve head, and an aspirator chamber is defined closely to the valve head for developing a pressure lower than a secondary pressure due to a suction caused by a nozzle. The rod has a first communication hole and a second communication hole that are defined therein which provides fluid communication between the back pressure chamber and the aspirator chamber.

15 Claims, 6 Drawing Sheets

REGULATOR

BACKGROUND OF THE INVENTION

1. Field of the Invention

The present invention relates to a regulator for use with fuel cells or a fuel gas supply device or the like for motor vehicles, for regulating a fluid under pressure introduced from a primary port to a desired secondary pressure and delivering the pressure-regulated fluid from a secondary port.

2. Description of the Related Art

Heretofore, a solid polymer membrane fuel cell has a stack of cells (hereinafter referred to as the fuel cell stack) each comprising an anode and a cathode, and a solid polymer electrolyte membrane interposed between the solid polymer electrolyte membrane. When hydrogen is supplied as a fuel to the anode and air is supplied as an oxidizing agent to the cathode, hydrogen ions are generated at the anode by a catalytic reaction. The hydrogen ions move through the solid polymer electrolyte membrane to the cathode. Electric power is generated in the fuel cell by the electrochemical reaction.

The fuel cell system includes an air compressor for supplying air as a reactant gas to the cathodes of the fuel cell stack and a pressure control valve for supplying hydrogen as a reactant gas to the anodes of the fuel cell stack under a pressure depending on the pressure of air which is given as a signal pressure. The pressure of the reactant gas supplied to the anodes with respect to the pressure of the reactant gas supplied to the cathodes is adjusted to a predetermined pressure for thereby achieving a predetermined power generation efficiency, and the flow rate of the reactant gas supplied to the fuel cell stack is controlled to obtain a desired fuel cell output.

The applicant of the present application has proposed a gas pressure reducing valve for use in a fuel gas supply device, as disclosed in Japanese laid-open patent publication No. 2002-182751 and Japanese laid-open patent publication No. 11-270717.

SUMMARY OF THE INVENTION

It is a general object of the present invention to provide a regulator suitable for use with fuel cells and a fuel gas supply device.

A major object of the present invention is to provide a regulator in which a fluid is supplied to the regulator at a constant pressure, and the regulator is capable of reducing a pressure change at the time the flow rate of the fluid supplied to a secondary port is increased, thus providing desirable pressure vs. flow rate characteristics.

Another object of the present invention is to provide a regulator which is free of abrupt cross-sectional area changes in a fluid passage through which a fluid under pressure flows, and is capable of suppressing self-excited oscillations.

Still another object of the present invention is to provide a regulator which is capable of preventing a valve head from being inclined on a valve seat.

Yet another object of the present invention is to provide a regulator which is capable of achieving good slidability in a sliding region of an outer circumferential surface of a guide member and a guide sleeve.

Yet sill another object of the present invention is to provide a regulator which is capable of preventing parts from sticking to each other due to a sealing action.

A further object of the present invention is to provide a regulator which is capable of providing a large adjustment range for the spring forces of springs.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
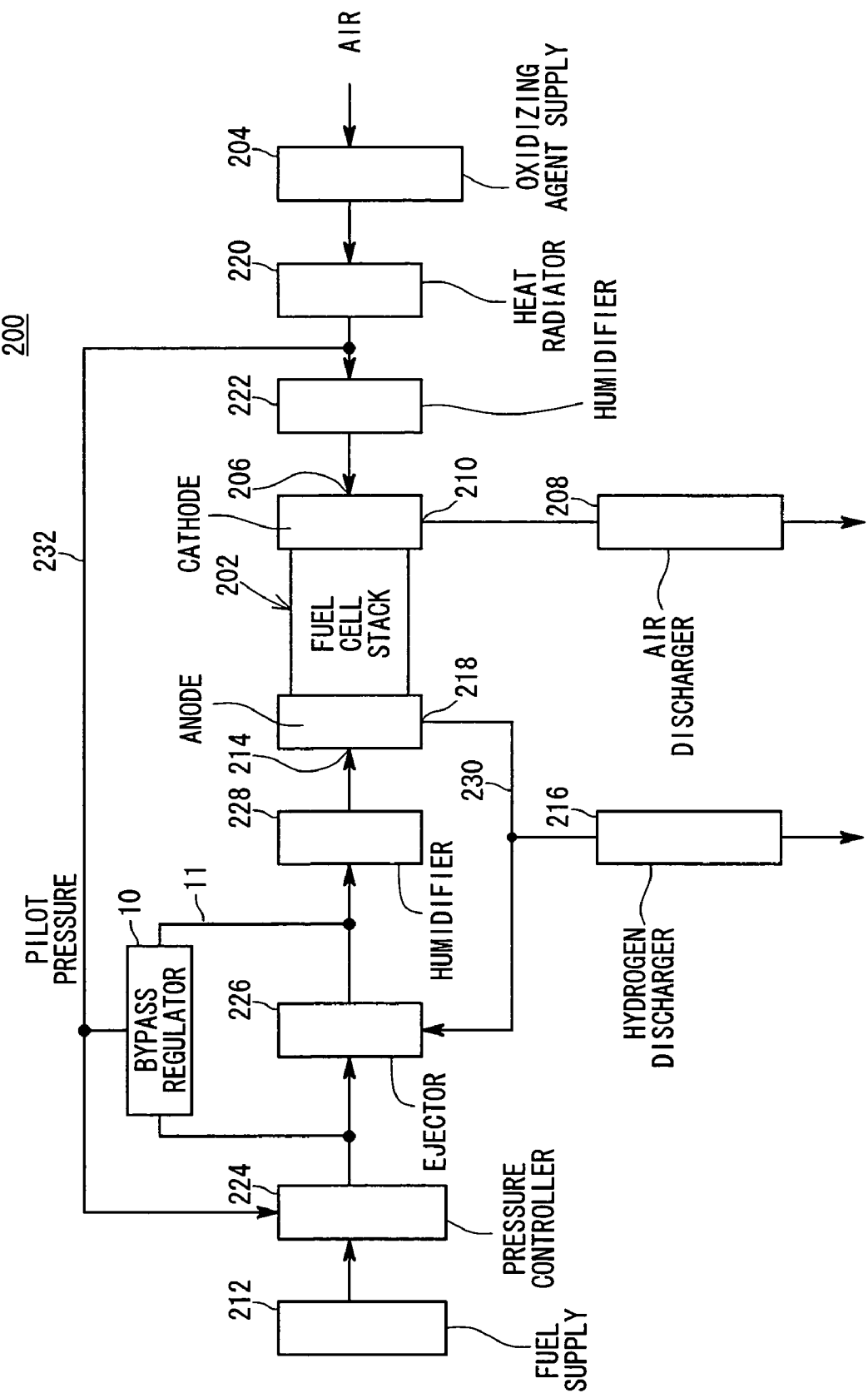
FIG. 1 is a block diagram of a fuel cell system which includes a bypass regulator according to a first embodiment of the present invention.

FIG. 1 is a block diagram of a fuel cell system 200 which incorporates a bypass regulator 10 according to a first embodiment of the present invention. The fuel cell system 200 is mounted on a vehicle such as an automobile or the like. The bypass regulator 10 functions as a regulator according to the present invention.

The fuel cell system 200 includes a fuel cell stack 202 having a stack of cells each comprising an anode, a cathode, and a solid polymer electrolyte membrane such as a solid polymer ion exchange membrane interposed between the anode and the cathode. A gas mainly containing hydrogen (hereinafter referred to as "hydrogen") as a fuel gas (hereinafter referred to as "fuel" if necessary) is supplied to the anode of the fuel cell stack 202 and air containing oxygen, for example, as an oxidizing agent is supplied to the cathode of the fuel cell stack 202.

The cathode has an air supply port 206 for being supplied with air from an oxidizing agent supply 204 and an air discharge port 210 connected to an air discharger 208 for discharging air in the cathode. The anode has a hydrogen supply port 214 for being supplied with hydrogen from a fuel supply 212 and a hydrogen discharge port 218 connected to a hydrogen discharger 216.

The fuel cell stack 202 is arranged such that hydrogen ions generated at the anode by a catalytic reaction move through the solid polymer electrolyte membrane to the cathode, and electric power is generated in the electrochemical reaction.

To the air supply port 206, there are connected the oxidizing agent supply 204, a heat radiator 220, and a cathode humidifier 222 by an air supply passage. The air discharger 208 is connected to the air discharge port 210 by an air discharge passage.

To the hydrogen supply port 214, there are connected the fuel supply 212, a pressure controller 224, an ejector 226, and an anode humidifier 228 by a hydrogen supply passage. The hydrogen discharger 216 is connected to the hydrogen discharge port 218 by a circulation passage 230.

The oxidizing agent supply 204 comprises, for example, a supercharger (compressor) and a motor for actuating the supercharger (not shown). The oxidizing agent supply 204 adiabatically compresses air, which is to be used as an oxidizing gas in the fuel cell stack 202, and supplies the compressed air to the fuel cell stack 202. When the air is adiabatically compressed, it is heated. The heated air that is supplied to the fuel cell stack 202 is effective to warm the fuel cell stack 202.

The air supplied from the oxidizing agent supply 204 is set to a certain pressure depending on the load on the fuel cell stack 202 or the position of an accelerator pedal (not shown), for example, before it is introduced into the fuel cell stack 202. After the air is cooled by the heat radiator 220, to be described below, it is supplied as a pilot pressure through a bypass passage 232 to the pressure controller 224.

The heat radiator 220 comprises an intercooler or the like (not shown), for example, and cools the air supplied from the oxidizing agent supply 204 during normal operation of the fuel cell stack 202 through a heat exchange with cooling water which flows through a flow passage. Therefore, the supplied air is cooled to a predetermined temperature and then introduced into the cathode humidifier 222.

The cathode humidifier 222 has a water-permeable membrane, for example. The cathode humidifier 222 humidifies the air, which has been cooled to the predetermined temperature by the heat radiator 220, to a certain humidity by passing water from one side of the water-permeable membrane to the other, and supplies the humidified air to the air supply port 206 of the fuel cell stack 202. The humidified air is supplied to the fuel cell stack 202 to keep the ion conductivity of the solid polymer electrolyte membranes of the fuel cell stack 202 in a predetermined state.

The air discharger 208 connected to the air discharge port 210 of the fuel cell stack 202 has a discharge valve (not shown) which discharges the air into the atmosphere.

The fuel supply 212 comprises a hydrogen gas container (not shown) for supplying hydrogen as a fuel to the fuel cells, for example. The fuel supply 212 stores hydrogen that is supplied to the anode of the fuel cell stack 202.

The pressure controller 224 includes a regulator 10 for fuel cells, to be described later. The pressure controller 224 sets a secondary pressure that is the pressure from the outlet of the pressure controller 224 to a pressure within a predetermined range, using the pressure of the air supplied through the bypass passage 232 as a pilot pressure (pilot signal pressure). For example, the pressure controller 224 sets the ratio of the pilot signal pressure to the secondary pressure to 1:3.

The ejector 226 comprises a nozzle and a diffuser (not shown). The fuel (hydrogen) supplied from the pressure controller 224 is accelerated when it passes through the nozzle, and ejected toward the diffuser. When the fuel flows at a high speed from the nozzle to the diffuser, a negative pressure is developed in an auxiliary chamber disposed between the nozzle and the diffuser, attracting the fuel discharged from the anode through the circulation passage 230. The fuel and the discharged fuel that are mixed together by the ejector 226 are supplied to the anode humidifier 228. The fuel discharged from the fuel cell stack 202 circulates through the ejector 226.

Therefore, the unreacted gas discharged from the hydrogen discharge port 218 of the fuel cell stack 202 is introduced through the hydrogen passage 230 into the ejector 226. The hydrogen supplied from the pressure controller 224 and the gas discharged from the fuel cell stack 202 are mixed with each other and supplied to the fuel cell stack 202.

The anode humidifier 228 has a water-permeable membrane, for example. The anode humidifier 228 humidifies the fuel, which has been delivered from the ejector 226, to a certain humidity by passing water from one side of the water-permeable membrane to the other, and supplies the humidified fuel to the hydrogen supply port 214 of the fuel cell stack 202. The humidified hydrogen is supplied to the fuel cell stack 202 to keep the ion conductivity of the solid polymer electrolyte membranes of the fuel cell stack 202 in a predetermined state.

The hydrogen discharger 216, which has a discharge control valve, not shown, is connected to the hydrogen discharge port 218 of the fuel cell stack 202 by the circulation passage 230. The discharge control valve can be opened and closed depending on an operating state of the fuel cell stack 202 for discharging excessive water (mainly liquid water) in a discharged gas which has been separated by a reservoir tank, not shown.

Figure 2:
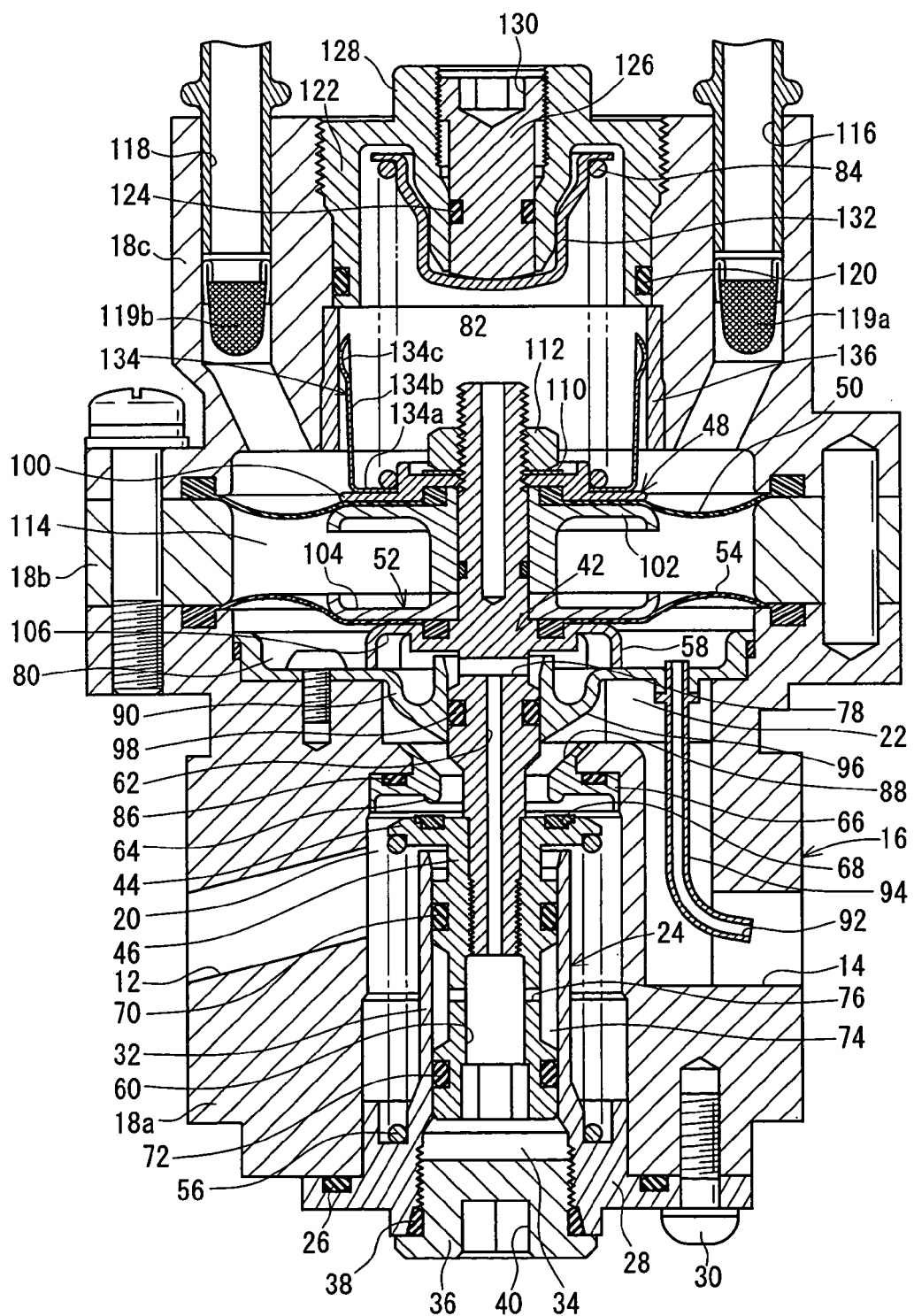
FIG. 2 is a vertical cross-sectional view of the bypass regulator shown in FIG. 1 with a valve which is open under normal conditions.
Figure 3:
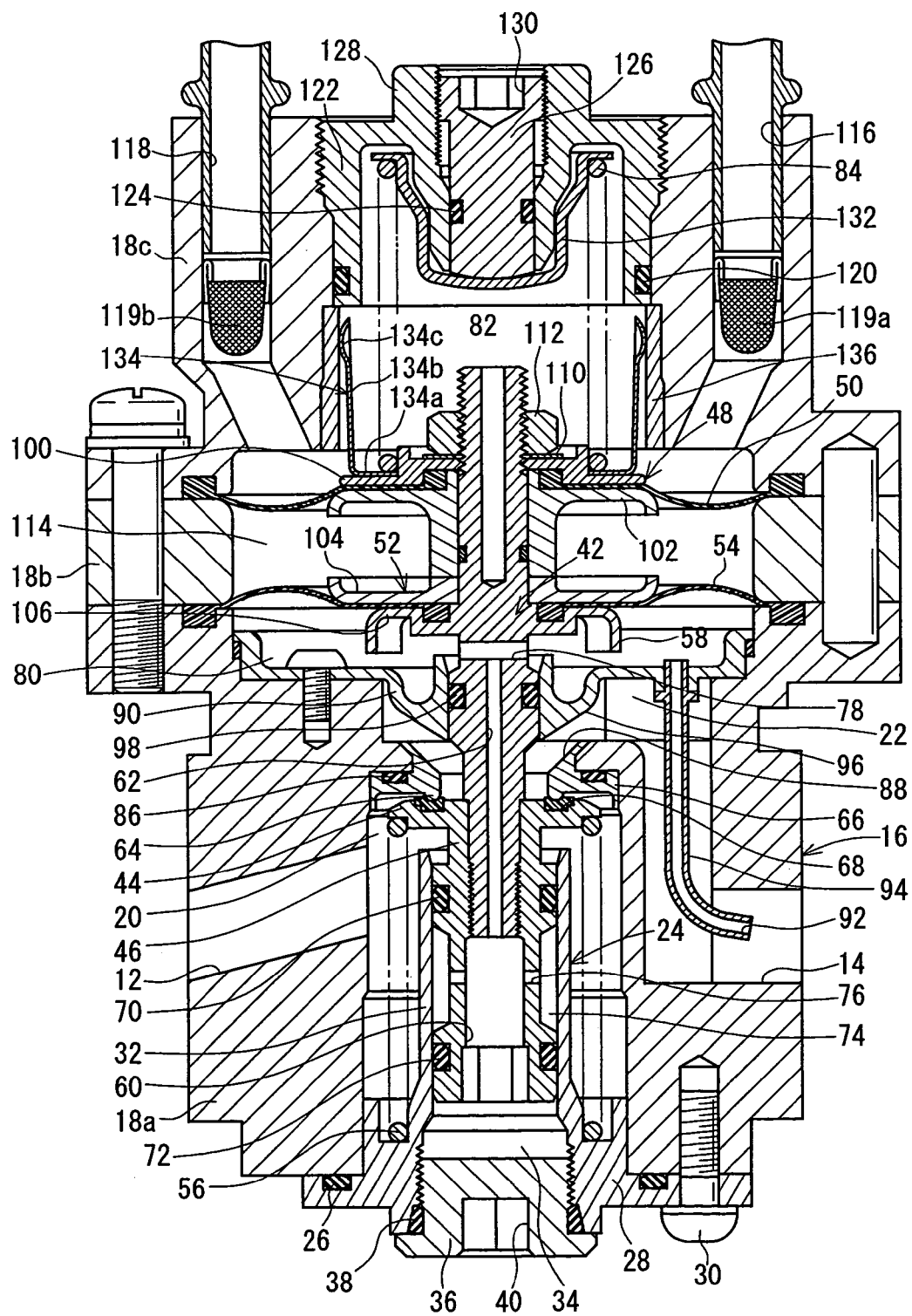
FIG. 3 is a vertical cross-sectional view of the bypass regulator shown in FIG. 1 with the valve which is closed.

The bypass regulator 10 according to the first embodiment, which is incorporated in a bypass passage 11 between the pressure controller 224 and the anode humidifier 228, is shown in FIGS. 2 and 3.

The bypass regulator 10 includes a body 16 having a primary port 12 for introducing hydrogen supplied from the pressure controller 224 through the bypass passage 11 and a secondary port 14 for regulating the pressure of the hydrogen introduced from the primary port 12 to a predetermined pressure and delivering the pressure-regulated hydrogen to the anode humidifier 228 in bypassing relation to the ejector 226. The body 16 is made up of a first block 18a, a second block 18b, and a third block 18c that are stacked and integrally joined together. The body 16 has a space 20 defined therein which houses therein a valve mechanism 24 for selectively opening and closing a fluid passage 22 that provides fluid communication between the primary port 12 and the secondary port 14.

The first block 18a has a hole defined in the bottom thereof, and a valve head guide member 28 is received in the hole and joined to the first block 18a by a bolt 30 with an O-ring 26 interposed therebetween. The valve head guide member 28 has an integral cylindrical guide sleeve 32 projecting a predetermined length in the axial direction of the space 20. The valve head guide member 28 has a central hole defined therein in which there is threaded a closure member 36 closing a back pressure chamber 36, to be described later, with an O-ring 38 interposed between the valve head guide member 28 and the closure member 36. The closure member 36 has a recess 40 having a rectangular cross-sectional shape which is defined in an end thereof. The recess 40 serves to receive a tool or the like, not shown, for threading the closure member 36 into the central hole in the valve head guide member 28 from outside of the regulator 10.

The valve head guide member 28 and the first block 18a are formed separately independently of each other, and can easily be assembled together by the bolt 30. Since the valve head guide member 28 and the first block 18a are formed as separate members, a fluororesin coating can be applied to the valve head guide member 28 without affecting the material and surface treatment of the body 16 (the first block 18a). If the valve head guide member 28 and the first block 18a were integrally formed and a fluororesin coating were applied to the integral assembly, then when the integral assembly is baked, an alumite film applied to the surface of the first block 18a of the body 16 would be broken.

As the substantially central hole is defined in the valve head guide member 28 and subsequently closed by the closure member 36, a fluororesin coating can easily be applied by spraying to an inner wall surface of the guide sleeve 32 of the valve head guide member 28. The fluororesin coating thus applied is uniform and stable. After the fluororesin coating is applied by spraying to the inner wall surface of the guide sleeve 32, the closure member 36 can easily be mounted in the hole in the valve head guide member 28.

The valve mechanism 24 includes a rod 42 extending in the axial direction of the body 16 and a guide member 46 fitted over the rod 42 and having an integral valve head 44 projecting radially outwardly.

The valve mechanism 24 also has a large-diameter first diaphragm 50 coupled to an end of the rod 42 by a first retaining mechanism 48 and a small-diameter second diaphragm 54 disposed between the first diaphragm 50 and the valve head 44 and coupled to the rod 42 by a second retaining mechanism 52. The first diaphragm 50 and the second diaphragm 54 have respective pressure-bearing areas which are identical to each other.

The rod 42 has an integral stopper 58 formed on an intermediate portion thereof and comprising four fingers bent into an L-shaped cross section and angularly spaced at angular intervals of about 90 degrees in the circumferential direction. The stopper 58 serves as part of the second retaining mechanism 52.

The guide member 46 comprises an elongate hollow cylinder having a first communication hole 62 which communicates with a hollow region 60 defined in the guide member 46. The valve head 44 which projects a predetermined length radially outwardly is integrally formed with an end of the hollow cylinder of the guide member 46. The guide member 46 has an elongate portion extending below the valve head 44 and performing a guiding function for preventing the valve head 44 from being inclined when the valve head 44 is seated on a valve seat 64.

The guide member 46 is of a reduced weight as it has the hollow region 60 and the first communication hole 62, and hence suffers reduced self-excited oscillations and is subject to reduced sliding resistance. The portion of the guide member 46 which performs its guiding function and the guide sleeve 32 are coated with a fluororesin coating to achieve good slidability in a sliding region of the guide member 46 and the guide sleeve 32 for increased durability. An annular rubber member 68 is applied to the area of the valve head 44 which is to be seated on the valve seat 64.

An O-ring 70 is mounted in an annular groove defined in the outer circumferential surface of the guide member 46 near the valve head 44, and an O-ring 72 is mounted in an annular groove defined in the outer circumferential surface of the guide member 46 at a position spaced from the O-ring 70 remotely from the valve head 44. The O-rings 70, 72 which are held in contact with the guide sleeve 32 for performing a sealing function are spaced a predetermined distance from each other for providing a desired increased sliding resistance to suppress self-excited oscillations.

When the guide member 46 is displaced along the guide sleeve 32 as the O-rings 70, 72 slide against the latter, the guide member 46 is linearly guided while being displaced in unison with the rod 42, allowing the valve head 44 to be seated on the valve seat 64 without being inclined with respect to the valve seat 64.

The O-ring 72 disposed remotely from the valve head 44 may be replaced with a sealing member such as a Y-gasket or the like or a sliding member such as a bearing or the like, not shown, to provide a desired sliding resistance. The guide sleeve 32 may have a hole, not shown, and the O-ring 70 may be replaced with a sealing member such as a Y-gasket or the like or a sliding member such as a bearing or the like.

The guide member 46 has an annular recess defined in the outer circumferential surface thereof between the O-ring 70 and the O-ring 72, providing an annular space 74 between the guide member 46 and the guide sleeve 32. The annular space 74 is held in communication with the axially extending first communication hole 62 through a hole 76 defined in the guide member 46 substantially perpendicularly to the first communication hole 62.

The annular space 74 defined between the O-ring 70 and the O-ring 72 which are spaced a predetermined distance from each other and communicating with the first communication hole 62 develops a negative pressure between the O-ring 70 and the O-ring 72, preventing the O-ring 70 and the O-ring 72 from sticking to the inner wall surface of the guide sleeve 32 (from being attracted thereto by a sealing action). Therefore, the guide member 46 is given desired slidability with respect to the guide sleeve 32 of the valve head guide member 28. The present invention is not limited to the hole 76 defined in communication with the first communication hole 62, but a hole, not shown, may be defined in the guide sleeve 32 of the valve head guide member 28 to prevent a sealed state from being developed between the O-ring 70 and the O-ring 72.

The back pressure chamber 34 that is surrounded by the guide sleeve 32 and the closure member 36 is defined in the end of the guide member 46 whose outer circumferential surface is sealed by the O-ring 70 and the Y-gasket 72. The back pressure chamber 34 is effective to reduce the pressure imposed on the valve head 44 for improved pressure vs. flow rate characteristics. Stated otherwise, the force tending to urge the valve head 44 in a direction away from the valve seat 64 under a regulated secondary pressure and the force tending to urge the valve head 44 in a directed to be seated on the valve seat 64 with a fluid under pressure introduced into the back pressure chamber 34 cancel each other, thus reducing the pressure imposed on the valve head 44.

The back pressure chamber 34 is held in communication with an aspirator chamber 80, to be described later, through the first communication hole 62 which extends a predetermined length axially in the rod 42, and a second communication hole 78 crossing the first communication hole 62 substantially perpendicularly thereto.

A coiled first spring 56 is disposed around the guide member 46 and has an end engaging the valve head 44 and the other end engaging in an annular recess defined in the body valve guide member 28. The spring force of the first spring 56 is smaller than the spring force of a coiled second spring 84 which is disposed in a pilot chamber 82, to be described later. The valve head 44 biased under the spring force of the first spring 56 is normally held in an open valve position that is spaced a predetermined distance from the valve seat 64 in relation to the spring force of the second spring 84.

Since the spring force of the second spring 84 which urges the valve head 44 to be spaced from the valve seat 64 overcomes the spring force of the first spring 56 which normally urges the valve head 44 to be seated on the valve seat 64, the valve mechanism is of the normally open type in which the valve head 44 is spaced a predetermined distance from the valve seat 64 in a normal condition where no pilot pressure is applied. Since the valve mechanism is of the normally open type, hydrogen whose pressure is regulated to a pressure higher than the pilot pressure of the pilot air can be delivered from the secondary port 14.

A valve seat member 66 which includes the valve seat 64 for seating thereon the valve head 44 of the guide member 46 is disposed on an inner wall surface of the first block 18a, and an O-ring 86 having a sealing function is disposed between the valve seat member 66 and the inner wall surface of the first block 18a. The valve seat member 66 is crimped in place on an annular ridge formed on the first block 18a. The valve seat member 66 has a tapered surface 88 progressively spreading in a direction away from the valve head 44 and surrounding the rod 42 out of contact therewith.

A space between the outer circumferential surface of the rod 42 and the tapered surface 88 of the valve seat member 66 functions as the fluid passage 22. The fluid passage 22 has its cross-sectional area progressively increased by the tapered surface 88 which progressively spreads upwardly away from the valve seat 64, and hence is free of abrupt cross-sectional area changes and is capable of suppressing self-excited oscillations.

An aspirator holder 90 having a through hole through which the rod 42 extends is screwed to a step formed in an upper portion of the first block 18a. The aspirator chamber 80 is defined between the aspirator holder 90 and the second diaphragm 54. To the aspirator holder 90, there is connected a nozzle 94 communicating with the aspirator chamber 80 and having a suction hole 92 directed toward the secondary port 14.

The fluid passage 22 which is progressively enlarged toward the secondary port 14 is defined between a slanted surface of the aspirator holder 90 and the tapered surface 88 of the valve seat 66. Therefore, the fluid passage 22 is free of abrupt cross-sectional area changes and is capable of suppressing self-excited oscillations.

An O-ring 98 is mounted in an annular groove defined in the outer circumferential surface of the rod 42, and held in contact with the surface of the through hole in the aspirator holder 90 to provide a sealing function to keep the aspirator chamber 80 hermetically sealed. The aspirator chamber 80 is held in communication with the first communication hole 62 which extends axially through the rod 42 and the back pressure chamber 34 near the guide member 46 through the second communication hole 78 extending perpendicularly to the axis of the rod 42.

The retaining mechanism 48 comprises a first upper retainer 100 held against an upper surface of the first diaphragm 50 and a first lower retainer 102 held against a lower surface of the first diaphragm 50. The first upper and lower retainers 100, 102 are mounted on the rod 42 at their respective central holes. The first diaphragm 50 has an outer circumferential edge portion which is not retained by the first upper and lower retainers 100, 102, but sandwiched between the second block 18b and the third block 18c.

The second retaining mechanism 52 comprises a second upper retainer 104 held against an upper surface of the second diaphragm 54 and a second lower retainer 106 held against a lower surface of the second diaphragm 54. Only the second upper retainer 104 is mounted on the rod 42, and the second lower retainer 106 is integrally formed with the rod 42. The second diaphragm 54 has an outer circumferential edge portion which is not retained by the second upper and lower retainers 104, 106, but sandwiched between the first block 18a and the second block 18b.

After the second upper retainer 104, the first lower retainer 102, and the first upper retainer 100 are successively stacked on the second lower retainer 106 that is integrally formed with the rod 42, they are fastened to the rod 42 by a wave washer 110 and a nut 112.

The stopper 58 which is bent downwardly into an L-shaped cross section is formed on the outer circumferential edge of the second lower retainer 106. The stopper 58 comprises four fingers angularly spaced at angular intervals of about 90 degrees in the circumferential direction. When the first diaphragm 50, the second diaphragm 54, and the rod 42 are displaced downwardly in unison with each other under a pilot pressure supplied to the pilot chamber 82, the stopper 58 abuts against an upper surface of the aspirator holder 90, limiting the displacement of the rod 42 thereby to perform its stopping function.

An atmospheric chamber 114 that is closed by an inner wall surface of the second block 18b is defined between the first diaphragm 50 and the second diaphragm 54, and is held in communication with the atmosphere through a passage, not shown.

The pilot chamber 82 is defined above the first diaphragm 50 and surrounded by an inner wall surface of the third block 18c. The pilot chamber 82 is held in communication with a pilot inlet port 116 and a pilot outlet port 118. Filters 119a, 119b for removing dust particles or the like contained in the pilot air are disposed respectively in the pilot inlet port 116 and the pilot outlet port 118.

The pilot chamber 82 is closed by a large-diameter first adjustment screw (first adjustment member) 122 which is threaded into an internally threaded hole in the third block 18c with an O-ring 120 interposed therebetween, and a small-diameter second adjustment screw (second adjustment member) 126 which is threaded into an internally threaded hole that is defined centrally in the first adjustment screw 122.

The first adjustment screw 122 has an adjustment knob 128 having a hexagonal cross-sectional shape, and the second adjustment screw 126 has an adjustment cavity 130 having a hexagonal cross-sectional shape.

The second spring 84 is disposed in the pilot chamber 82, and has an end engaging a spring retainer 132 and the other end engaging a leaf spring 134 which is to be described later. The first adjustment screw 122 can make coarse adjustment of the spring force of the second spring 84, and the second adjustment screw 126 can make fine adjustment of the spring force of the second spring 84.

By thus adjusting the spring force of the second spring 84 in two stages with the first and second adjustment screws 122, 126, the spring force of the second spring 84 can be adjusted in a large adjustment range, providing a good spring load capability with small spring load changes.

A cylindrical bushing 136 of stainless steel is mounted on the inner wall surface of the third block 13c which defines the pilot chamber 82. The leaf spring 134 is held in frictional contact with an inner circumferential surface of the bushing 136 for imparting sliding resistance to the first diaphragm 50.

The leaf spring 134 comprise an annular portion 134a mounted on an annular land of the first upper retainer 100, a plurality of legs 134b raised upwardly perpendicularly to the annular portion 134a and angularly spaced at predetermined intervals in the circumferential direction, and a plurality of curved portions 134c disposed respectively on the distal ends of the legs 134b. The leaf spring 134 is coated with a diamond-like carbon coating or the like to provide an appropriate contact resistance between the bushing 136 and the curved portions 134c for a desired sliding resistance.

Since the bushing 136 of stainless steel is mounted on the inner wall surface of the third block 13c a and has its inner circumferential surface held in contact with the curved portions 134c of the leaf spring 134, the inner circumferential surface of the bushing 136 is protected for increased durability.

Operation and advantages of the bypass regulator 10 according to the first invention will be described below.

In the first embodiment, the spring force of the second spring 84 disposed in the pilot chamber 82 is greater than the spring force of the first spring 56 disposed below the valve seat 44. Therefore, the valve mechanism is open with the valve head 44 spaced a predetermined distance from the valve seat 64 in a normal condition where no pilot pressure is supplied to the pilot chamber 82.

Consequently, according to the first embodiment, the pressure of hydrogen discharged from the secondary port 14 may be higher than the pilot pressure (the pressure of the pilot air) unlike a normally closed regulator where the valve head 44 is seated on the valve seat 64 in a normal condition.

When the oxidizing agent supply 204 is actuated in response to a movement of an accelerator pedal or the like, pilot air is introduced through the bypass passage 232 and a pilot port, not shown, into the pilot chamber 82. The pilot air introduced into the pilot chamber 82 acts to press the first diaphragm 50 downwardly. The first diaphragm 50, the second diaphragm 54, and the valve head 44 which are coupled together by the rod 42 are displaced downwardly in unison with each other, and the valve head 44 is spaced from the valve seat 64. At this time, the stopper 58 integral with the rod 42 abuts against a flat upper surface of the aspirator holder 90, limiting the displacement of the rod 42.

When hydrogen supplied from the primary port 12 passes through the gap between the valve head 44 and the valve seat 64, the pressure thereof is reduced to a desired pressure corresponding to the pilot pressure. The pressure-regulated hydrogen then passes through the fluid passage 22, and is thereafter discharged from the secondary port 14 to the ejector 226.

When the secondary pressure of the hydrogen flowing through the fluid passage 22 counterbalances the pressure which is the sum of the pilot pressure and the spring force of the second spring 84, the valve head 44 is seated on the valve seat 64, closing the valve mechanism (see FIG. 3).

According to the first embodiment, when the hydrogen discharged from the secondary port 14 is increased in quantity, the pressure in the aspirator chamber 80 becomes lower than the pressure (secondary pressure) discharged from the secondary port 14 due to a suction that occurs through the suction hole 92 of the nozzle 94 that is directed toward the secondary port 14. Since the back pressure chamber 34 and the aspirator chamber 80 are held in communication with each other through the hollow region 60, the first communication hole 62, and the second communication hole 78 that are defined in the rod 42, the pressure in the back pressure chamber 34 is equalized with the pressure the aspirator chamber 80, and becomes lower than the secondary pressure discharged the secondary port 14. According to the present embodiment, therefore, the pressure in the back pressure chamber 34 may be lower than would be if the back pressure chamber 34 and the fluid passage 22 connected to the secondary port 14 communicated with each other.

Figure 4:
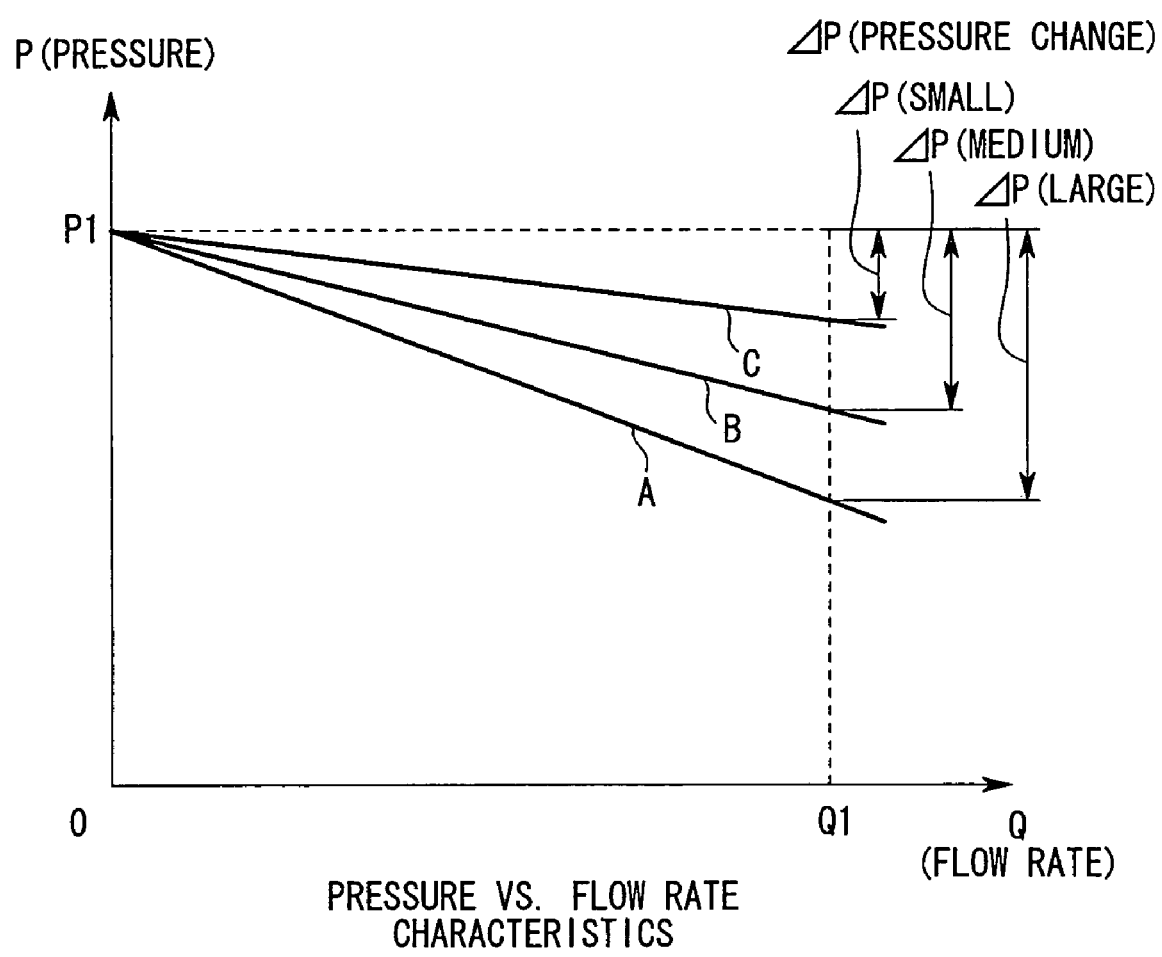
FIG. 4 is a graph showing pressure vs. flow rate characteristics which represent the magnitudes of pressure changes when a flow rate is changed, and the fluid is supplied to the regulator at a constant pressure.

FIG. 4 shows pressure vs. flow rate characteristics when the flow rate Q of the fluid is changed. The fluid is supplied at a constant pressure P1. In FIG. 4, a linear characteristic curve A represents pressure vs. flow rate characteristics plotted when only the back pressure chamber 34 is provided. A linear characteristic curve B represents pressure vs. flow rate characteristics plotted when the back pressure chamber 34 communicates with the fluid passage 22 connected to the secondary port 14. A linear characteristic curve C represents pressure vs. flow rate characteristics plotted when the back pressure chamber 34 communicates with the aspirator chamber 80.

As can be understood from FIG. 4, a pressure change $\Delta P$ that is caused when the flow rate Q of the fluid under pressure is increased to a flow rate Q1 under the constant pressure P1 is the greatest for the linear characteristic curve A that is plotted when only the back pressure chamber 34 is provided. The pressure change $\Delta P$ for the linear characteristic curve B that is plotted when the back pressure chamber 34 communicates with the fluid passage 22 connected to the secondary port 14 is smaller than the pressure change $\Delta P$ for the linear characteristic curve A. The pressure change $\Delta P$ for the linear characteristic curve C that is plotted when the back pressure chamber 34 communicates with the aspirator chamber 80 is the smallest, i.e., smaller than the pressure changes $\Delta P$ for the linear characteristic curves A, B.

According to the first embodiment, therefore, since the back pressure chamber 34 and the aspirator chamber 80 are held in communication with each other through the hollow region 60, the first communication hole 62, and the second communication hole 78 that are defined in the rod 42, the pressure change $\Delta P$ is prevented from unduly increasing even when the flow rate of the fluid under pressure increases, thus minimizing a pressure loss. As a result, the regulator according to the first embodiment provides good pressure vs. flow rate characteristics.

According to the first embodiment, the regulator 10 has two diaphragms, i.e., the first diaphragm 50 which flexes under the pressure of air supplied as the pilot pressure and the second diaphragm 54 which flexes under the pressure of hydrogen flowing through the fluid passage 22, with the atmospheric chamber 114 defined between the first diaphragm 50 and the second diaphragm 54.

Therefore, even when either the first diaphragm 50 or the second diaphragm 54 has its durability degraded, the air and the hydrogen are prevented from being mixed with each other. Even if air or hydrogen finds its way into the atmospheric chamber 114, it can be discharged into the atmosphere through the non-illustrated passage.

Figure 5:
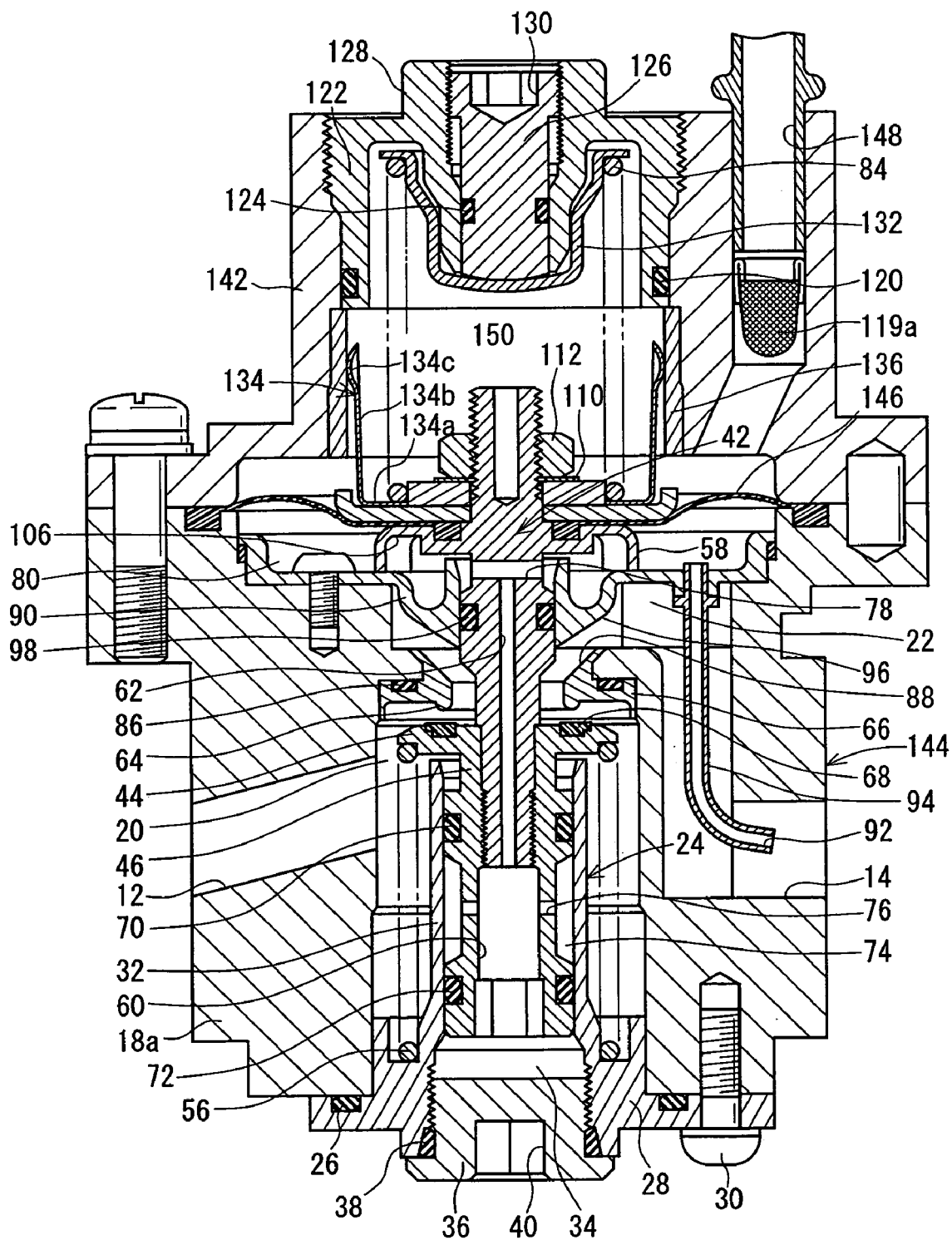
FIG. 5 is a vertical cross-sectional view of a bypass regulator with a valve which is open under normal conditions according to a second embodiment of the present invention.
Figure 6:
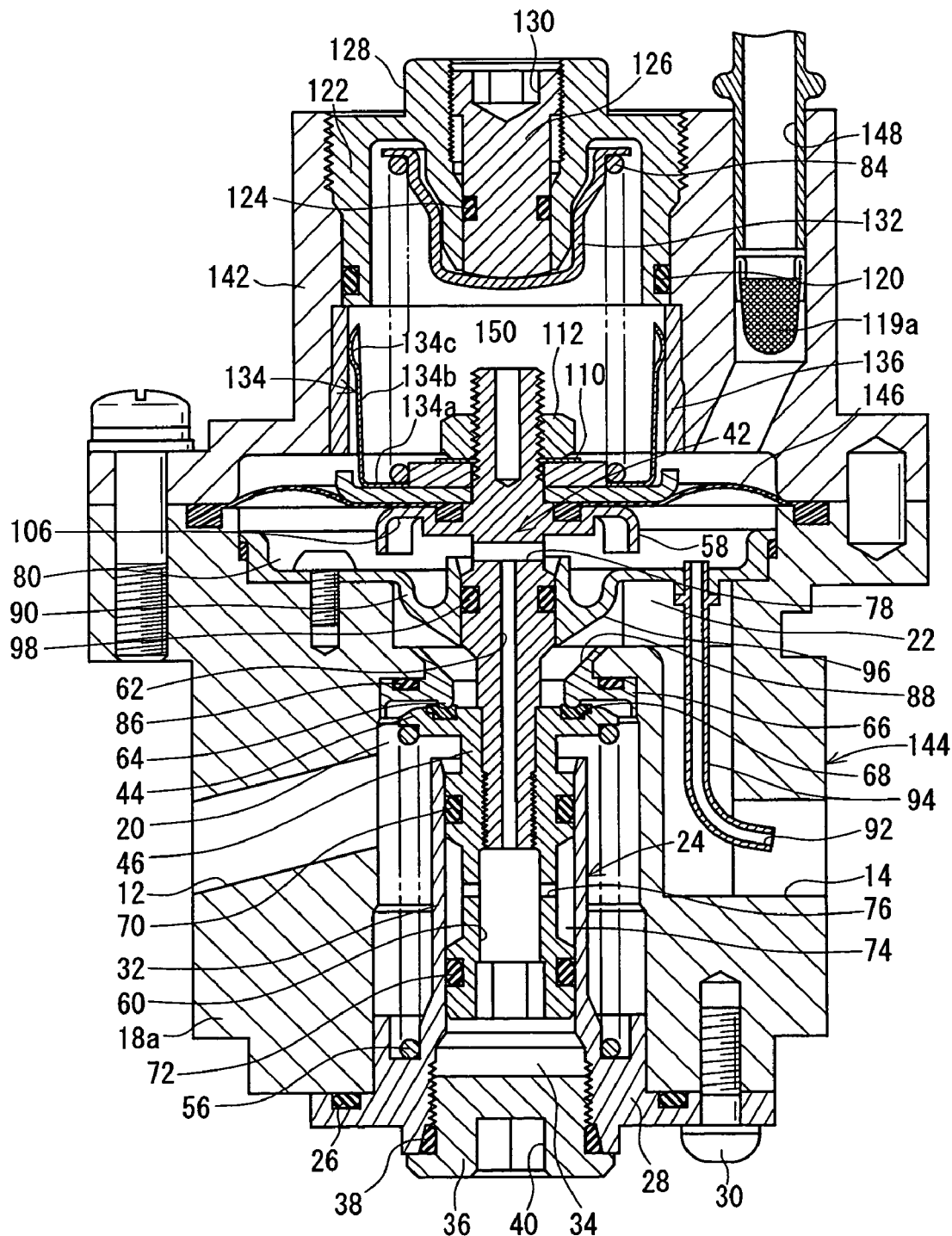
FIG. 6 is a vertical cross-sectional view of the bypass regulator shown in FIG. 5 with the valve which is closed.

A gas regulator 140 according to a second embodiment of the present invention is shown in FIGS. 5 and 6. Those components of the gas regulator 140 which are identical to those of the bypass regulator 10 according to the first embodiment are denoted by identical reference characters, and will not be described in detail below. The gas regulator 140 functions as a regulator according to the present invention.

The gas regulator 140 according to the second embodiment is preferably applied to a fuel gas supply device as disclosed in Japanese laid-open patent publication No. 2002-182751 and Japanese laid-open patent publication No. 11-270717, for example.

The gas regulator 140 according to the second embodiment has a body 144 comprising a first block 18a and a second block 142 which are integrally joined to each other, with a single diaphragm 146 sandwiched between the first block 18a and the second block 142. An atmospheric chamber 150 communicating with an atmospheric port 148 is defined in the second block 142.

A compressed natural gas is introduced as a fuel gas into the primary port 12 of the first block 18a. The pressure of the compressed natural gas that is discharged from the secondary port 14 is set by the spring force of the second spring 84 which is adjusted by the first adjustment screw 122 and the second adjustment screw 126.

Stated otherwise, since the gas regulator 140 according to the second embodiment is not supplied with a pilot pressure unlike the bypass regulator 10 according to the first embodiment, the gas regulator 140 according to the second embodiment differs from the bypass regulator 10 according to the first embodiment in that a secondary pressure is set by the first adjustment screw 122 and the second adjustment screw 126.

Other structural details, operation, and advantages of the gas regulator 140 according to the second embodiment are identical to those of the bypass regulator 10 according to the first embodiment, and will not be described in detail below.

What is claimed is:

1. A regulator comprising:
   a body having a primary port for introducing a fluid under pressure and a secondary port for delivering the fluid regulated to a desired pressure;
   a valve head displaceably disposed in said body for being unseated from and seated on a valve seat for opening and closing a fluid passage which interconnects said primary port and said secondary port;
   a rod coupled to said valve head for displacement in unison with the valve head;
   a diaphragm engaging said rod and flexible for displacing said rod in an axial direction of said rod;
   a nozzle comprising a tube body having a suction hole directed toward said secondary port; and
   a back pressure chamber defined at an end of said rod for acting in a direction to cancel out a pressure applied to said valve head, and an aspirator chamber defined closely to said valve head for developing a pressure lower than a pressure in said secondary port due to a suction caused by said nozzle, said rod having a communication hole which provides fluid communication between said back pressure chamber and said aspirator chamber,
   wherein said regulator is incorporated in a fuel cell system having a fuel cell stack having an anode and a cathode,
   said regulator being mounted in a bypass passage between a pressure controller for discharging a pressure to the secondary port which has been regulated depending on a pilot pressure, and an anode humidifier for humidifying a fuel delivered from an ejector to a predetermined humidity and supplying the humidified fuel to said fuel cell stack.

2. A regulator according to claim 1, further comprising a valve seat member which has said valve seat, said valve seat member having a tapered surface providing a fluid passage cross section which progressively spreads along the fluid passage communicating with said secondary port.

3. A regulator according to claim 2, further comprising an aspirator holder, said aspirator chamber being defined by said aspirator holder, said aspirator holder having a slanted surface, said fluid passage cross section being provided so as to progressively spread between said slanted surface of said aspirator holder and said tapered surface of the valve seat member.

4. A regulator according to claim 1, wherein said valve head is mounted on a guide member connected to an end of said rod, said valve head being guided by a valve head guide member having a guide sleeve which surrounds an outer circumferential surface of the guide member except for said valve head.

5. A regulator according to claim 4, wherein a fluororesin coating is applied to a sliding region of the outer circumferential surface of the guide member and the guide sleeve.

6. A regulator according to claim 4, wherein a pair of sealing members spaced a predetermined distance from each other axially of the guide member which is cylindrical is disposed between said guide member and said guide sleeve.

7. A regulator according to claim 6, wherein each of said sealing members comprises an O-ring.

8. A regulator according to claim 6, wherein an annular space communicating with a communication hole extending axially of said rod is defined between said sealing members.

9. A regulator according to claim 4, wherein said valve head guide member is separate from said body.

10. A regulator according to claim 9, wherein said valve head guide member has a hole defined centrally therein which is contiguous to said guide sleeve, said hole being closed by a removable closure member.

11. A regulator according to claim 1, further comprising a leaf spring disposed in said pilot chamber for applying a sliding resistance to said diaphragm, said leaf spring having a leg with a curved portion held in contact with a cylindrical bushing of stainless steel which is mounted in said body.

12. A regulator according to claim 11, wherein said leaf spring has an outer surface coated with a diamond-like carbon coating.

13. A regulator according to claim 11, further comprising a first adjustment member and a second adjustment member for adjusting in two stages the spring force of a spring for pressing said diaphragm toward said valve head.

14. A regulator according to claim 1, wherein said fuel cell system is mounted on an automobile.

15. A regulator comprising:
   a body having a primary port for introducing a fluid under pressure and a secondary port for delivering the fluid regulated to a desired pressure;
   a valve head displaceably disposed in said body for being unseated from and seated on a valve seat for opening and closing a fluid passage which interconnects said primary port and said secondary port;
   a rod coupled to said valve head for displacement in unison with the valve head;
   a diaphragm engaging said rod and flexible for displacing said rod in an axial direction of said rod;
   a back pressure chamber defined at an end of said rod for acting in a direction to cancel out a pressure applied to said valve head, and an aspirator chamber defined closely to said valve head for developing a pressure lower than a pressure in said secondary port due to a suction caused by a nozzle, said rod having a communication hole which provides fluid communication between said back pressure chamber and said aspirator chamber;
   a valve seat member which has said valve seat, said valve seat member having a tapered surface providing a fluid passage cross section which progressively spreads along the fluid passage communicating with said secondary port; and
   an aspirator holder, said aspirator chamber being defined by said aspirator holder, said aspirator holder having a slanted surface, said fluid passage cross section being provided so as to progressively spread between said slanted surface of said aspirator holder and said tapered surface of the valve seat member.

* * * * *